United States Patent
Hansson et al.

(10) Patent No.: US 7,383,793 B2
(45) Date of Patent: Jun. 10, 2008

(54) METHOD AND A DEVICE FOR PRODUCTION OF MECHANICAL WORK AND COOLING/HEATING IN CONJUNCTION WITH A COMBUSTION MACHINE

(75) Inventors: Hans-Erik Hansson, Finspång (SE); Mats Westermark, Täby (SE)

(73) Assignee: HyHeat AB, Stockholm (SE)

( * ) Notice: Subject to any disclaimer, the term of this patent is extended or adjusted under 35 U.S.C. 154(b) by 459 days.

(21) Appl. No.: 10/517,530

(22) PCT Filed: Jun. 4, 2003

(86) PCT No.: PCT/SE03/00907

§ 371 (c)(1),
(2), (4) Date: Dec. 13, 2004

(87) PCT Pub. No.: WO03/104636

PCT Pub. Date: Dec. 18, 2003

(65) Prior Publication Data

US 2006/0054111 A1    Mar. 16, 2006

(30) Foreign Application Priority Data

Jun. 11, 2002    (SE) .................................... 0201771

(51) Int. Cl.
*F02B 75/00*    (2006.01)
(52) U.S. Cl. .................. 123/39; 123/25 B; 123/559.1; 60/618

(58) Field of Classification Search .................. 123/39, 123/559.1, 559.2, 562, 563, 565, 568.12, 123/568.13, 41.01, 41.55; 60/618, 651
See application file for complete search history.

(56) References Cited

U.S. PATENT DOCUMENTS

| | | | |
|---|---|---|---|
| 4,366,674 A | * | 1/1983 | Eakman ........................ 60/618 |
| 4,611,557 A | | 9/1986 | Hierzenberger |

FOREIGN PATENT DOCUMENTS

| | | |
|---|---|---|
| DE | 31 42 851 A1 | 6/1983 |
| DE | 33 33 069 A1 | 3/1985 |
| DE | 195 38 067 A1 | 4/1997 |
| EP | 0 305 351 | 3/1989 |
| WO | WO 95/23286 | 8/1995 |
| WO | WO 98/07975 | 2/1998 |

\* cited by examiner

*Primary Examiner*—Stephen K. Cronin
*Assistant Examiner*—Hyder Ali
(74) *Attorney, Agent, or Firm*—Jacobson Holman PLLC

(57) ABSTRACT

A device and a method to extract mechanical energy in combination with heat and/or coiling from a combustion engine, to which fuel and air is fed, whereby water is added to the combustion engine's inlet air prior to combustion. The combustion engine's flue gas is fed at above-atmospheric pressure to the fist stage of a flue gas condenser, from which heat is extracted and utilized by a heat consumer and/or a sorption cycle. After condensation, the water-lean flue gas is reheated in order to avoid ice formation during the final expansion.

19 Claims, 4 Drawing Sheets

METHOD AND A DEVICE FOR PRODUCTION OF MECHANICAL WORK AND COOLING/HEATING IN CONJUNCTION WITH A COMBUSTION MACHINE

This is a nationalization of PCT/SE03/00907 filed Jun. 4, 2003 and published in English.

The present invention refers to a method and device of the kind defined in the preambles of the appended independent claims.

The addition of water vapor to the intake air of a combustion engine is previously known, e.g. from PCT SE 9500026, which reveals a technique in which a combustion engine drives a power generator, heat is extracted from pressurized flue gases, and finally the flue gases are expanded to such a degree that the outlet flue gases obtain low temperatures (below 0° C.) and can be directly utilized for cooling purposes.

In this above-mentioned type of process, there are certain problems regarding the processes' limited flexibility and incomplete exploitation of available energy.

For example, the electric efficiency and the power output of the process are reduced and ice crystals are formed at the expander exit. These serious drawbacks make operation more difficult and add costs.

One aim with the invention is therefore to propose a process that offers efficient heat-extraction from the combustion engine's flue gases combined with efficient humidification of the combustion engine's combustion air, at the same time as maximizing the electrical output and efficiency of the process and ensuring the process is water self-sufficient.

These goals are entirely or partly achieved by the method and device defined in the appended independent claims to the method and the device Embodiments of the invention are defined in the appended dependent claims.

In a practical and especially favourable form of the invention, a large amount of water is added to the inlet air of the combustion engine. Fuel, air and water vapor are combined so that combustion in the combustion engine occurs close to, if not in, stoichiometric conditions.

Hereby, a maximum degree of the heat content of the flue gas will be in the form of latent heat that can be effectively utilized at useful temperatures by condensation.

In order to obtain useful heat, it is especially essential that combustion is performed at near-stoichiometric conditions when condensation is carried out at low over-pressures Condensation at increased pressure improves temperature performance and improves the feasibility of water self-sufficiency.

The extracted heat can be led to a heating net (steam net, hot water net, central heating, district heating, hot tap water etc) and to a sorption cycle in any chosen portion.

Furthermore, in tractionary applications with combustion engines or fuel cells, water self-sufficiency and an improved heating yield gives advantages for the generation of comfort heating or the production of sorptive cooling.

The water vapour content of the flue gas will be condensed out at successively declining temperature levels due to a decreasing dew-point temperature during the condensation process.

A condenser partitioned into two or more condensing sections is preferred, whereby the heat extracted from the last part of the condenser, which is at the lowest temperature, can be utilised to humidify the inlet air by, for example, transferring heat to the inlet air while simultaneously adding of water.

The then humidified inlet air can be compressed, optionally together with the fuel, e.g., natural gas, before it is feed to the combustion engine. This compression can be driven with a turbine (expander) through which the flue gases pass before exiting the process.

Prior to this expansion, the exiting flue gases can be heated by, for example, flue gases or hot air from the air charger, via a heat exchanger. The turbine will then generate more shaft work and possibly enough shaft work to compress the fuel/air mixture to the engine. Through obtaining a suitable expander inlet temperature, the formation of ice at the expander outlet is avoided.

A sorption cooler, or some other sorption cycle, can be heated by the first condenser section, which extracts heat in the temperature interval of, e.g., 110° C. to 85° C. In order to reach these comparatively high temperature levels it is necessary to perform the condensation in pressurized condensers placed upstream of the expander. For good temperature performance, near stoichiometric combustion is preferred, which can be obtained by ensuring a high humidity in the combustion air. Since stoichiometric combustion minimizes the dilution of water vapour with inert gases, a maximal dew point temperature and improved condensation temperature can be obtained.

A second condenser section is placed downstream of the first condenser and extracts heat at a lower temperature level to be utilized for humidification of the inlet air to the engine. The second condenser section can work, for example, between 85° C. and 25° C., and thereby the inlet air can be heated and humidified, for example, from 15° C. to ca 40-50° C. before it is compressed in the turbo compressor.

Examples of sorption cycles include absorption chillers, absorption heat pumps and sorption dehumidifiers using liquid or solid sorbents. Other examples are sorptive separation processes for the separation of carbon dioxide from the flue gas using monoethyleamine or other solvents. Excellent absorption conditions for carbon dioxide removal can be reached downstream of the second condenser section since the flue gas has a high partial pressure of carbon dioxide (it is pressurized and has a low humidity ratio) and is accessible at low temperature.

The use of a final condenser in the pressurized flue gas is essential for the extraction of heat for the inlet humidifier as it improves the water balance and facilitates the efficient recovery of heat from the flue gas.

The condensers can be made comparatively small in area and volume due to the good heat transfer from the condensing water vapour. The combustion engine type is arbitrary, but can include a shaft to deliver mechanical work to, e.g., a generator for power generation. It may include preheating of the fuel/air mixture prior to the inlet to the cylinders.

Furthermore, prior to the inlet to the cylinders, the air or the air/fuel mixture can be given an additional humidification in a intercooler where the gas is brought in direct contact with liquid water until the gas is nearly saturated with water vapour. Relative humidifies of 80-100% are considered optimal.

Likewise, pressurized fuel cells involving the compression and humidification of the inlet media (air and gaseous fuel) and expansion of the outgoing media, can use similar principles for heat recovery and water reuse. By the use of pressurized flue gas condensation in combination with humidification of the inlet air, large improvements can be made in heat recovery, condensation temperatures and water self-sufficiency.

A dust filter and/or a liquid scrubber can be used for the removal of corrosive or environmentally damaging compounds from the flue gas, the scrubber preferably being placed downstream of the condensing units. The make-up water for the scrubber may be condensate from the condensers. Ammonia gas from nitrogen oxide removal can be captured and dosing of sodium hydroxide improves the removal of acidic compounds such as sulfur dioxide and sulfuric acid. The corrosion of downstream heat exchangers and expanders is prevented in this way. The bleed-off liquid from the scrubber can be treated in conventional ways with filters for the removal of dust and soot and with chemical methods for concentration or modification of the dissolved compounds.

The invention is described and examples are given with references to the enclosed figures.

Figure 1:
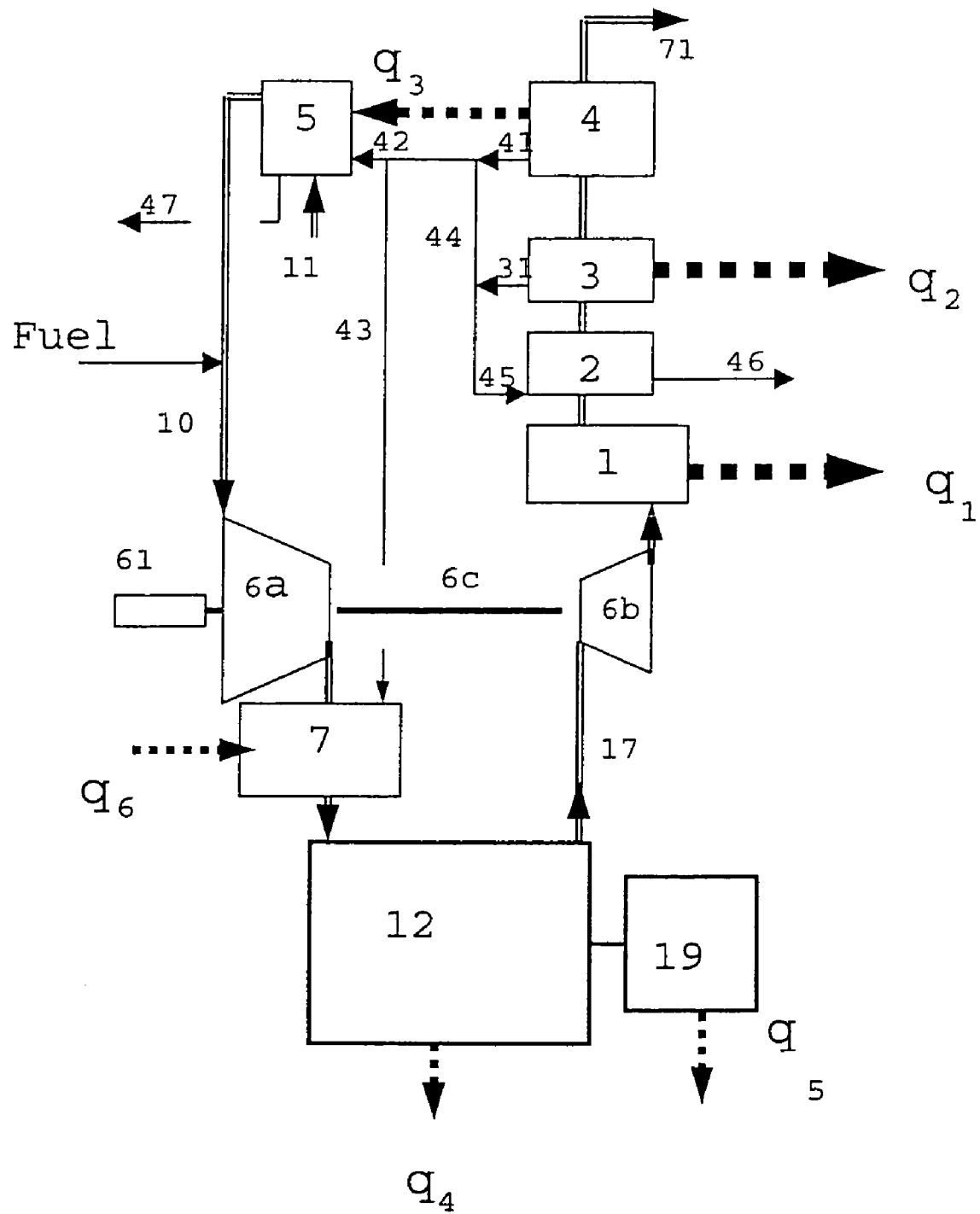
FIG. 1 shows schematically a simple design for the condensation of flue gases under atmospheric pressure and thereafter are led to the atmosphere.

FIG. 1 illustrates an inlet pipe 10 to a combustion engine 12. It should be noted that FIG. 1 is disclosed for understanding of the invention and is not part of the invention as defined in the claims. The pipe 10 has an inlet section 11 that receives ambient air which is then fed to an air humidifier 5 that receives heat $q_3$ and water from a pipe 42. The bleed-off water from the humidifier 5 is removed via an outlet pipe 47. Fuel, e.g. natural gas, is fed to the machine 12, via an inlet to the pipe 10 upstream of the engine 12 or by a direct intake to the machine.

A turbocharger 6 is comprised of a compressor 6a that is coupled to an expander 6b. It is shown to be coupled to an electric motor for extra work input. For large engines the compressor and the expander are turbo machines whereas screw, twinscrew or piston types dominate for smaller engines or similar power sizes in fuel cells. Furthermore, in some applications a pressure regulating outlet valve is used instead of an expander. In the inlet pipe 10 downstream of the compressor 6a is an additional humidifier 7, which works under pressurized conditions and is supplied with water from the pipes 41, 42 and 43. In the humidifier 7 the pressurized air is brought in direct contact with water, which leads to further humidification to nearly saturated conditions, preferably 80-100% relative humidity. Additional external heat $q_6$ can be added.

The combustion engine 12 is coupled to an power generator 19 or another load. The combustion engine 12 is shown to have a flue gas pipe 17 with an expander 6b and further downstream a heat recovery boiler 1, generating a heat stream q, which is led away to be utilized.

The mixture of water, fuel and air entering the engine 12 is chosen to offer a mixture for combustion that is preferably nearly stoichiometric.

Downstream of the heat recovery boiler 1 the flue gas mainly contains water in gaseous form. The flue gas is treated in a liquid scrubber 2 with water from the pipes 41,44,31,45. The pipe 46 is a bleed-off of scrubber effluents containing captured, suspended, and dissolved compounds. The treated flue gas from the scrubber 2 is led to a first condenser 3 from which a heat flow $q_2$ is extracted, mainly due to condensation of water vapour from the flue gas.

The flue gas condensate from condenser 3 is led away by the outlet pipe 31. The outlet flue gas from the condenser 3 is led further to a downstream second condenser 4 that is designed to condense a substantial part of the remaining water vapour, the condensate being removed by pipe 41. The condensate contributes to the water supply of other wet units as it can be led to the scrubber 2 via the piping 44 and 45 or led to the humidifier 5 or the pressurized humidifier 7. The condenser 4 is designed to extract a heat flow $q_3$, which evaporates the remaining amount of water vapour for establishing a mainly stoichiometric mixture of fuel/air/vapour in the engine 12. The pressurized humidifier 7 is extracting heat from the hot compressed air from the compressor 6a and by supplementary flue gas heat $q_6$.

The heat flows $q_1$, $q_2$ can be used to supply heat to a heat driven sorption cycle of known type. Such heat driven sorption cycles can preferably utilize heat from hest recovery boiler 1 and the condenser 3. A part of the heat can also be used for other applications such as comfort heating or industrial processes.

Figure 2:
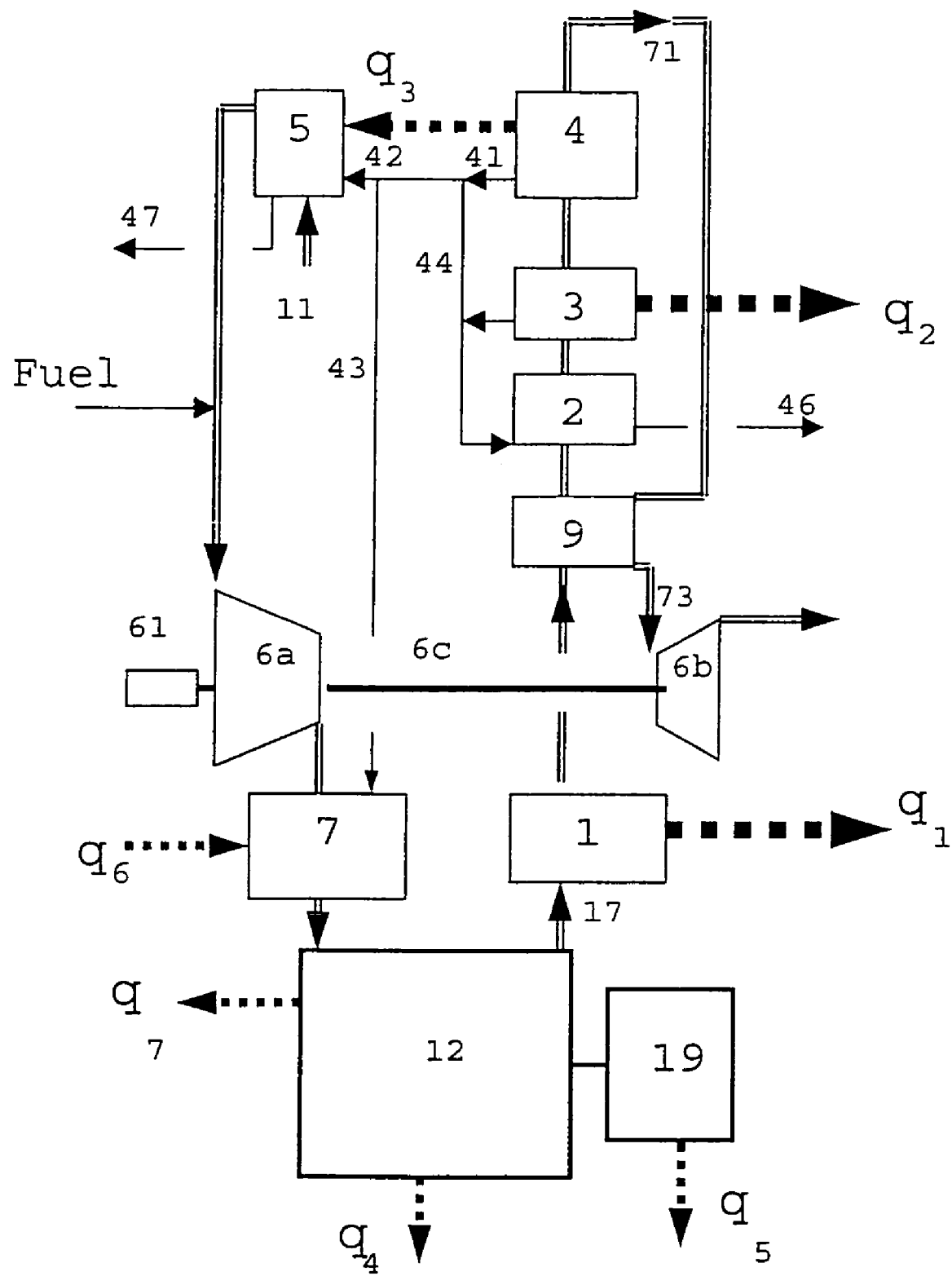
FIG. 2 shows, according to the invention, a process where the flue gas is condensed under pressurized conditions and then reheated, expanded and led to the atmosphere.

The process according to FIG. 2 is different from FIG. 1 mainly by subjecting the flue gas to flue gas condensation under pressurized conditions before it is reheated, expanded and led to the atmosphere. The flue gas pipe 17 has a section 71 that collects the outlet gas from the second condenser 4 and a heat exchanger 9 that reheats the flue gas by heat exchange with the flue gas upstream of the scrubber 2. The section 71 the reheater 9 and passes the expander 6b that forms a mean to establish a pressure in the flue gas pipe 17 upstream of the expander 6b. The pressure in the condensing parts should be at least 1.5 bar over atmospheric pressure and preferably more than 2 bar over atmospheric.

Equipment is included for heating and humidification of inlet air (5) as well as a second condensation stage (4) for supplementary condensation of flue gas. A possible design is that these two functions are integrated in the same stage in a way that condensation of flue gas is performed on one side of a heat exchanger area while heating and humidification of inlet air is performed on the other side of the same heat exchanger, the humidification side being wetted by water injection. Another design alternative is to perform the humidification in a packed tower, preferably counter-current with a descending water flow and upwards air flow. The outlet water stream is heated by heat from the final condenser (4) and optionally from other suitable heating sources e.g. oil cooler or generator cooling before it is recirculated to the top of the humidification tower.

In the design according to FIG. 2 the heat recovery boiler 1 is placed downstream of the engine 12 while the expander 6b is placed in the exit of the flue gas pipe 17.

Figure 3:
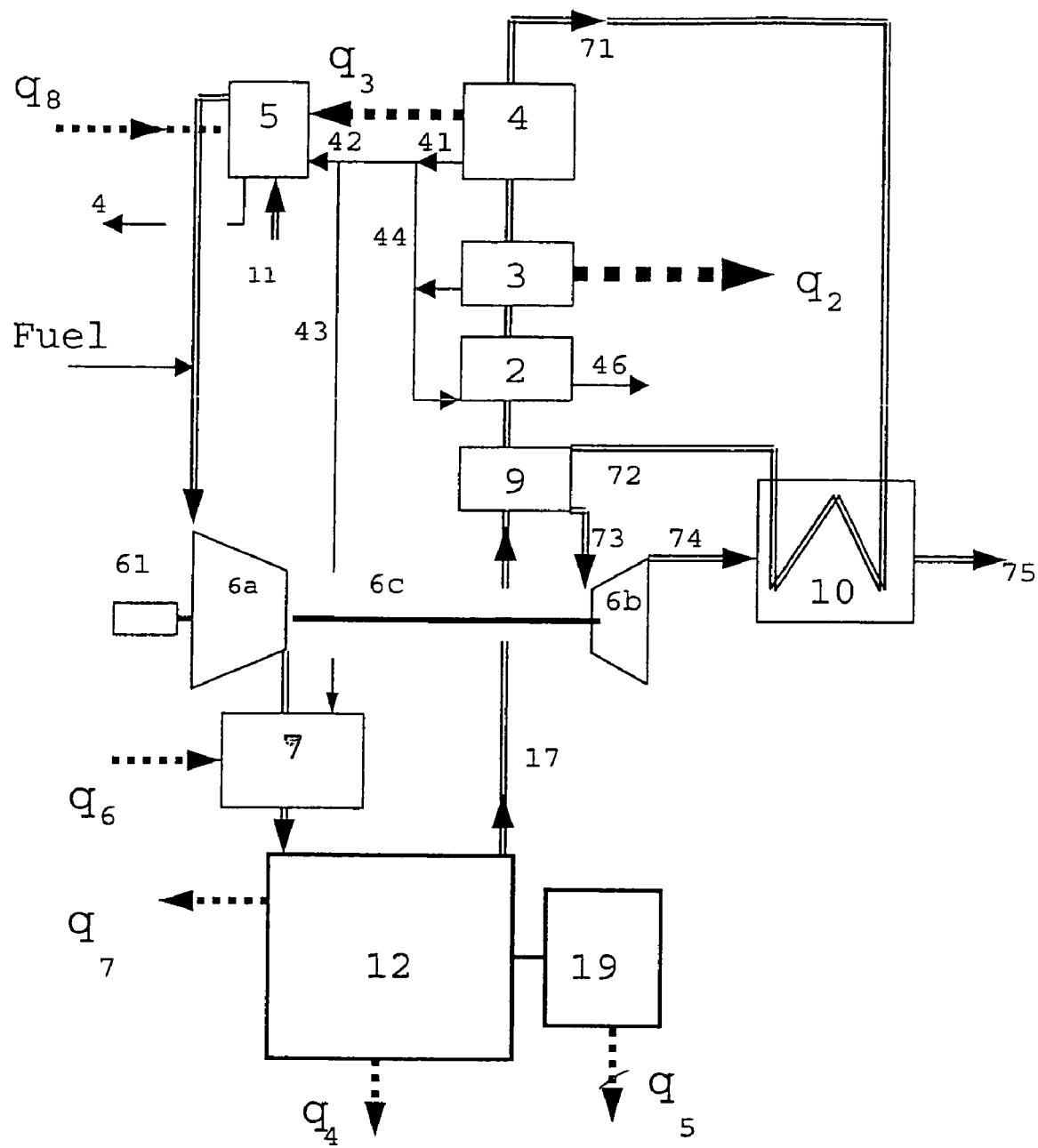
FIG. 3 shows, according to the invention, a process where the flue gas is condensed under pressurized conditions and then recuperated, expanded and submitted to heat recovery before it is led to the atmosphere.

The design according to FIG. 3 is mainly different than FIG. 2 by reheating and recuperating the condensed flue gas to a higher temperature in order to achieve more mechanical work from the expander. It is favorable if the expander work can be sufficient for compressor work thus eliminating or substantially decreasing the need for an input of external work.

With the use of a plant according to FIG. 2 or 3, a very large part of the energy content of the added fuel can be utilized to drive sorption machines and/or the generation of heat and for power production. The total efficiency is typically in the range of 105-112%, (defined as output energy from the engine divided by the lower heating value of added fuel). This high figure is mainly due to the extensive use of flue gas condensation, whereby the outlet flue gas (71) has a very low energy content. By reheating the flue gas in the reheater 9, the risk of ice formation in the expander 6b can be avoided as shown in FIG. 2.

It is shown in FIG. 2 that a heat flow $q_6$ can be added to the humidifier 7 when additional water flows (supplied by pipe 43) are added for humidification of inlet air. The heat flow $q_6$ can e.g. be a portion of $q_1$, $q_2$ or $q_4$. As an alternative, the compressed air upstream of expander 6b, can be used as a heat source for reheating the flue gas upstream of the expander 6b to prevent ice formation.

In FIGS. 2 and 3 it is indicated that several different heat flows are generated in the combustion engine system and, as previously known, these heat flows are transferred to a cooling system, at different temperatures. The heat streams released by cylinder cooling $q_4$, and from the heat recovery boiler $q_1$ are both at temperatures around 100° C. which makes them useful for district heating or for driving sorption cycles. The heat flow from the first part of the flue gas condenser, $q_4$, can be useful for similar purposes if the temperature is sufficiently high.

Figure 4:
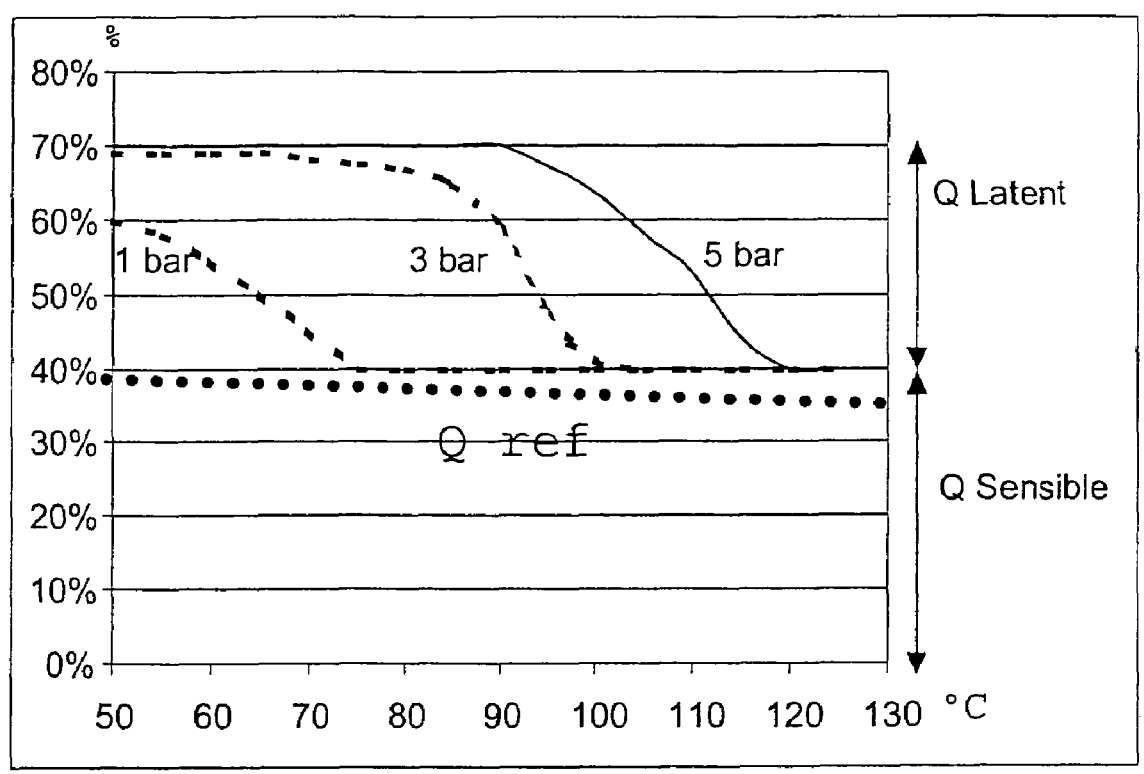
FIG. 4 shows recovered heat for humidified inlet air and different flue gas pressures.

In FIG. 4 the reference case, represented by curve "Q-ref", shows the recovered useful heat without condensation (i.e. heat recovery from cylinder cooling and conventional heat recovery boiler). The recovered heat is given as a % of the lower heating value of the fuel. Similar curves are given for cases using the innovative combination of pressurised flue gas condensation in two stages and inlet air humidification as shown in FIGS. 2 and 3. The curves are called "1 bar", "3 bar" and "5 bar" according to the absolute pressure of the flue gas condensers and they all represent stoichiometric combustion conditions.

FIG. 4 shows that pressurised condensing upstream of the expander is an effective measure to improve heat recovery from the flue gases. Compared with atmospheric condensing (1 bar), the temperature of the heat recovered is raised by ca 30° C. at a condensing pressure of 3 bars and by 50° C. at a condensing pressure of 5 bars. This improved heat recovery depends on the increased condensation rate of water from the flue gas, represented by the latent heat "Q lat", which also improves the minimum temperature level required to achieve a water self-sufficient operation.

Generator 19 also produces a heat flow q5 which can be utilised. The heat, q5 is obtained at a relatively low temperature level and can therefore be beneficially utilized to humidify the process inlet air, through warming the inlet air or humidification water by q5, for example, in humidifier 5 or upstream of it. Other low temperature heat sources from, for example, the oil coolant, may also be utilized to humidify the inlet air. Radiation and convective heat losses to the surrounding air can similarly utilized by using air from the engine casing as inlet air to the humidification tower.

The invention claimed is:

1. A method for the production of mechanical energy in combination with the extraction of cooling or heat in connection with a combustion engine, which is fed with fuel and air, whereby the combustion engine's inlet air is combined with water vapor before combustion, said method comprising:
   compressing inlet air to the combustion engine; and
   passing pressurized flue gases from the combustion engine for treatment in at least one pressurized flue gas condenser, said heat flow from said condenser being utilized by a heat consumer or a sorption cycle, and said flue gas after condensing, and before expansion in a turbine, being reheated in order to avoid ice formation during said expansion.

2. The method according to claim 1, wherein water vapor or condensate from condenser stages of the condenser is added to the inlet air.

3. The method according to claim 1, wherein said flue gas condensing is carried out at a flue gas pressure that is at least 2.5 bar absolute pressure.

4. The method according to claim 3, wherein the flue gas pressure is over 3 bar absolute pressure.

5. The method according to claim 1, wherein the combustion engine's inlet air is subjected to diabatic humidification at close to atmospheric pressure, and heat is transferred from a second stage of the flue gas condenser, downstream of a first flue gas condenser stage.

6. The method according to claim 1, wherein the combustion engine's inlet air is subjected to humidification at raised pressure, through the direct contact between water and compressed air.

7. The method according to claim 1, wherein said combustion is carried out with a substantially stoichiometric mixture of fuel/air/water.

8. The method according to claim 1, wherein the flue gas, after said flue gas condensing has occurred, is reheated by transferring heat from a warmer part of the flue gas or from the compressed inlet air.

9. The method according to claim 1, wherein the reheated flue gas is further heated with uncooled flue gas from the combustion engine, whereby the temperature difference between the streams and is under 200° C. and preferably under 100° C.

10. The method according to claim 1, wherein heat flows from the generator, oil coolant, or other waste heat flows from the engine is used to humidify the inlet air to the combustion engine.

11. A device to produce mechanical energy and heat or cooling in connection with a combustion engine which has the means to humidify the combustion engine's inlet air, said device comprising:
   a compressing device for compressing inlet air to the combustion engine;
   means for passing pressurized flue gases from the combustion engine for treatment in at least one pressurized flue gas condenser;
   a device to recover heat at elevated pressures from said flue gases by means of flue gas condensing, said heat being transferred to a heating net or to a sorption cycle in chosen proportions; and
   a device to reheat cooled flue gas after said flue gas condensing such that final expansion in a turbine can be carried out without ice formation.

12. A device according to claim 11, including means for adding water vapor or condensate to the inlet air by using condensate from condenser stages of the condenser.

13. A device according to claim 11, including means to maintain the flue gases at above-atmospheric pressures in the exit pipe from the combustion engine until a position downstream of the condensers.

14. A device according to claim 11, including means to add fuel, air and water vapor to the combustion engine to obtain substantially stoichiometric combustion.

15. A device according to claim 11, including means to transfer the heat for humidifying the intake air, from the power generator, oil cooling or radiation and convection losses.

16. A device according to claim 15, wherein the means to transfer the heat for humidifying the intake air transfers the heat at the humidification means.

17. A device according to claim 11, wherein the combustion engine consists of a pressurized fuel cell.

18. A device according to claim 11, where it is configured to use extracted heat to drive sorption processes for carbon dioxide removal.

19. A device according to claim 18, wherein the absorption unit is placed downstream of a final condenser.

* * * * *